US008007688B2

(12) United States Patent
Dahlin et al.

(10) Patent No.: US 8,007,688 B2
(45) Date of Patent: Aug. 30, 2011

(54) PROCESS FOR DECONTAMINATING SYNGAS

(75) Inventors: Robert S. Dahlin, Birmingham, AL (US); Thomas K. Gale, Vestavia Hills, AL (US)

(73) Assignee: Southern Research Institute, Birmingham, AL (US)

( * ) Notice: Subject to any disclaimer, the term of this patent is extended or adjusted under 35 U.S.C. 154(b) by 0 days.

(21) Appl. No.: 12/603,856

(22) Filed: Oct. 22, 2009

(65) Prior Publication Data

US 2010/0096594 A1 Apr. 22, 2010

Related U.S. Application Data

(60) Provisional application No. 61/107,478, filed on Oct. 22, 2008.

(51) Int. Cl.
*C01B 3/02* (2006.01)
*C01B 3/50* (2006.01)
*C01B 3/58* (2006.01)

(52) U.S. Cl. ............... 252/373; 423/237; 423/245.1; 423/210; 423/244.01; 423/244.07; 423/240 S; 423/220

(58) Field of Classification Search ............ 252/373; 423/237, 245.1, 210, 244.01, 244.07, 240 S, 423/220
See application file for complete search history.

(56) References Cited

U.S. PATENT DOCUMENTS

| | | | |
|---|---|---|---|
| 3,988,237 A | 10/1976 | Davis et al. | |
| 4,022,591 A | 5/1977 | Staudinger | |
| 4,046,523 A | 9/1977 | Kalina et al. | 48/197 R |
| 4,085,516 A | 4/1978 | Jukkola et al. | |
| 4,368,057 A | 1/1983 | Matthews | 48/197 R |
| 4,805,561 A | 2/1989 | Davis et al. | |
| 5,403,366 A | 4/1995 | Leininger et al. | 48/197 R |
| H1539 H * | 6/1996 | Mahagaokar et al. | 423/240 R |
| 5,611,963 A * | 3/1997 | Unger | 252/373 |
| 5,868,829 A | 2/1999 | Biermann et al. | |
| 7,618,558 B2 * | 11/2009 | Nielsen | 252/373 |
| 2002/0102189 A1 | 8/2002 | Madden et al. | 422/168 |
| 2004/0247509 A1 | 12/2004 | Newby | 423/240 S |
| 2007/0012595 A1 | 1/2007 | Brownscombe et al. | 208/14 |
| 2007/0031304 A1 | 2/2007 | Heidenreich et al. | 422/177 |
| 2007/0261948 A1 | 11/2007 | Jacobson | 201/15 |
| 2008/0222956 A1 | 9/2008 | Tsangaris et al. | 48/77 |
| 2010/0143225 A1* | 6/2010 | Serban et al. | 423/226 |

OTHER PUBLICATIONS

Felix et al., "Thermally Impregnated Ni-Olivine Catalysts for Decomposing TAR in Biomass Gasification," Paper OB5.3, *16th European Biomass Conference and Exhibition*, Valencia, Spain, Jun. 2-6, 2008.
Heidenreich et al., "Integration of a Catalytic Filter into a Gasifier for Combined Particle Separation and Tar Removal from Biomass Gasification Gas," *GCHT-7*, New Castle, Australia, Jun. 23-25, 2008.
Nacken et al. in "Development of a Tar Reforming Catalyst for Integration in a Ceramic Filter Element and Use in Hot Gas Cleaning," *Ind. Eng. Chem. Res.* 46:1945-1951 (2007).
Yoshiie et al., "Performance of Sorbent Particles for Removal of Cadmium in Hot Gas," *JSME Int'l Journal*, B:45(3):512-517 (2002).

* cited by examiner

*Primary Examiner* — Timothy C Vanoy
(74) *Attorney, Agent, or Firm* — Ballard Spahr LLP

(57) ABSTRACT

Disclosed herein is an apparatus and methods for decontaminating syngas generated in a fluidized-bed gasifier wherein metal contaminants, inter alia, alkali metals, halogens, particulates, and transition metals and sulfur containing contaminants are removed prior to the catalytic thermal cracking of tar and ammonia. Further disclosed is an apparatus and methods for removing ammonia from syngas.

27 Claims, 4 Drawing Sheets

PROCESS FOR DECONTAMINATING SYNGAS

PRIORITY

This application claims the benefit of priority from Provisional Application Ser. No. 61/107,478 that was filed on Oct. 22, 2008, the entirety of which is incorporated herein by reference.

FIELD

Disclosed herein is a process for decontaminating syngas that is generated from coal or a biomass, for example, generated in a fluidized-bed or entrained-flow gasifier wherein metal contaminants, halide contaminants, and sulfur-containing contaminants are removed followed by particulate removal and catalytic thermal cracking of tar and ammonia contaminants, in an integrated and compact system. Further disclosed is a process for removing ammonia from syngas.

BACKGROUND

The use of syngas from coal and biomass gasification is of increasing interest with regard to the demands of advanced energy generation and the production of alternative fuels. Due to the interest in distributed power generation and liquid fuels production, smaller compact gasification units are desired, including compact, yet simple, robust, and effective syngas cleanup. The compact, simple, and robust feature is as important as the effectiveness for distributed-generation systems. Without these characteristics, distributed generation systems are too costly to build and operate for the amount of electricity or liquid fuel produced. In addition however, the syngas must be free of contaminants, for example, metals, sulfur, ammonia, tars, alkalis, particulate matter, and the like in order to eliminate fouling and poisoning of sensitive downstream components such as gas turbine blades, fuel cells, gas separation membranes, and syngas reforming catalysts, such as water-gas shift (wgs) catalysts or Fischer-Tropsch (FT) catalysts.

As such, there is a need for compact, effective processes for treating syngas to reduce the levels of tars, metals, ammonia, halides, particulates and sulfur contaminants.

SUMMARY

Carbonaceous biomasses useful for generation of synthesis gas (syngas) comprise varying amounts of impurities depending upon the source of the biomass. Impurities include sulfur compounds, nitrogen compounds, halides, particulate matter, and metals, as well as other impurities such as tars that are present in the biomass or that can form during the gasification process. Sulfur compounds are removed to avoid pollution per se, as well as to prevent downstream contamination of units that either use the syngas as a source of fuel or further process the syngas for synthesis of other useful carbon-containing products. Nitrogen compounds, i.e., ammonia, nitrous oxide, and the like can also be a source of nitric oxide pollution. Metals, for example, potassium, lead, and the like are found in all biomasses as part of the non-carbonaceous fuel ash. Metals can react with materials that comprise other elements of the syngas treatment and conversion processes to diminish the effectiveness or otherwise destroy the element itself. For example, potassium and other metals can react to form eutectic solids that melt and collect on the surface of filter elements. Halides also permanently damage expensive catalysts, and particulate matter can damage turbine blades and blind catalysts. Fuel cells are not tolerant to any of the contaminants typically found in syngas.

Disclosed herein are processes for the production of syngas having a reduced level of metals, sulfur compounds, tars, halides, particulate matter, and ammonia. The process combines the use of calcium-based sorbents for sulfur and halide removal and aluminosilicates-based sorbents for capture and containment of vapors containing metals in the bed of a fluidized-bed gasifier or in the injection upstream of the candle filters in an entrained-flow gasifier with a high-temperature porous ceramic candle filter for thermally cracking tars and ammonia and removing particulates. Further disclosed is the use of nitric oxide for removal of ammonia contaminants from syngas.

Further disclosed is a process for extending the life of ceramic and metal filters by capturing metals upstream of the filter (either in the gasification zone or the freeboard, or on the surface of candle filter elements, where the sorbents can capture metal vapor, halides, and sulfur in the syngas stream prior to contacting and potentially reacting with the filter elements). The sorbents will by design to work with each individual system, gasifier, and fuel type. For example, most often, the sorbent injection system will be designed to capture metals while coated on the surface of the candle-filter elements while mixed with the rest of the particulate matter, so the sorbent types injected and the loading will be tailored for the specific ash and char type and loading that will be present for a specific gasifier and fuel type. The metal capture and entrainment is accomplished by injection of a sorbent for capturing metals at one or more stages in the syngas flow path, for example, following the gasifier, or alternatively, sorbents can be added to the bed of the gasifiers. Also disclosed are one or more apparatus that can be adapted for injection of sorbents at any point desired by the formulator.

These and other objects, features, and advantages will become apparent to those of ordinary skill in the art from a reading of the following detailed description, drawings, and the appended claims.

BRIEF DESCRIPTION OF THE FIGURES

As shown in FIG. 2, very little soluble silicon or aluminum was found in the filter cake for any of the tests, suggesting that few if any soluble metal/sorbent reaction products were formed. This is also evidence that the meta-kaolinite crystal structure remained in tact, and that little if any melting of the particles occurred. Furthermore, as little as 50% and as much as 85% of the potassium was insoluble for all filter cakes, suggesting that significant reactive capture of potassium occurred. As such, the data represented in FIG. 2 indicates significant sorbent utilization. Sorbent/metal equivalence ratio metal-capture-limit lines in FIG. 2 indicate the maximum percentage of metal that can be captured based on four different equivalence ratios, =1/1, 1/2, 1/4, and 1/8.

DETAILED DESCRIPTION

Figure 1:
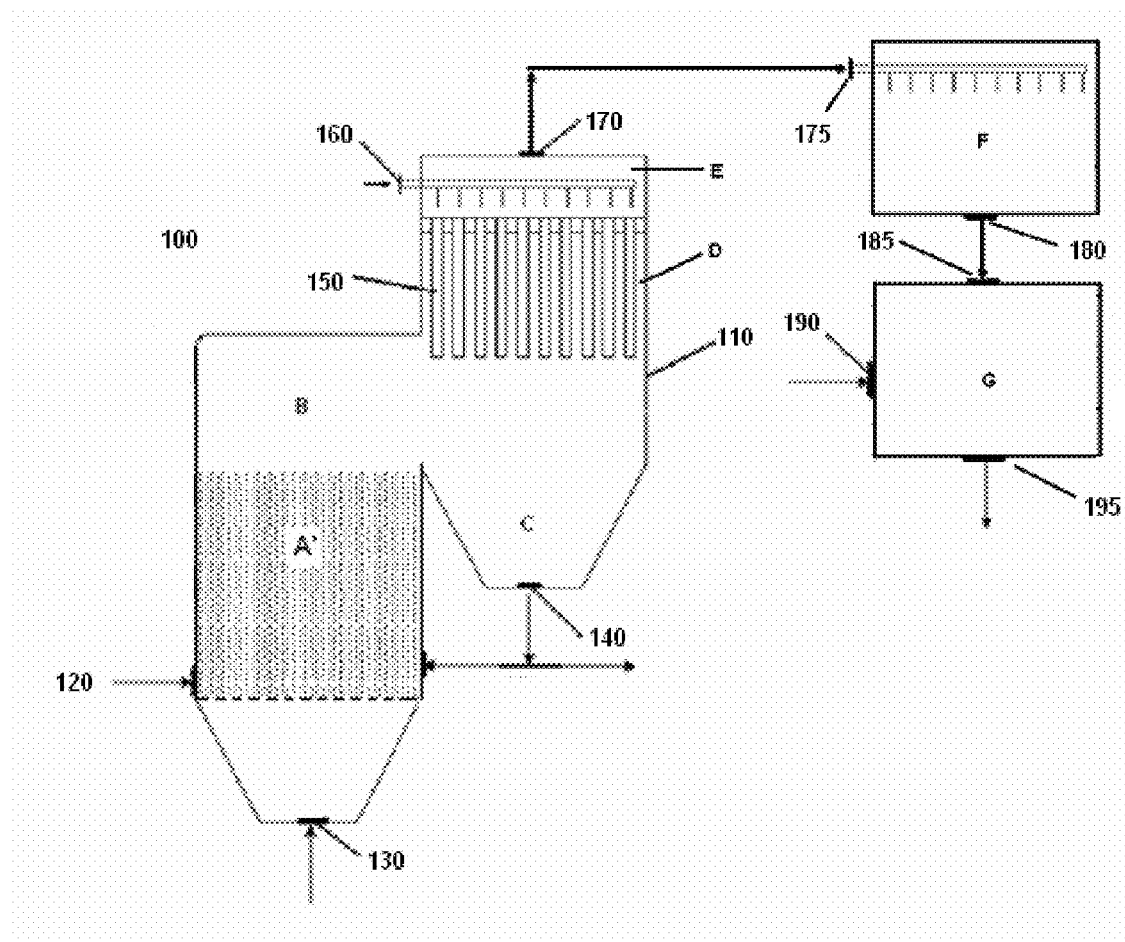
FIG. 1 depicts a generic modified gasification apparatus adapted for using nitric oxide as a method for removing ammonia contaminants.
Figure 2:
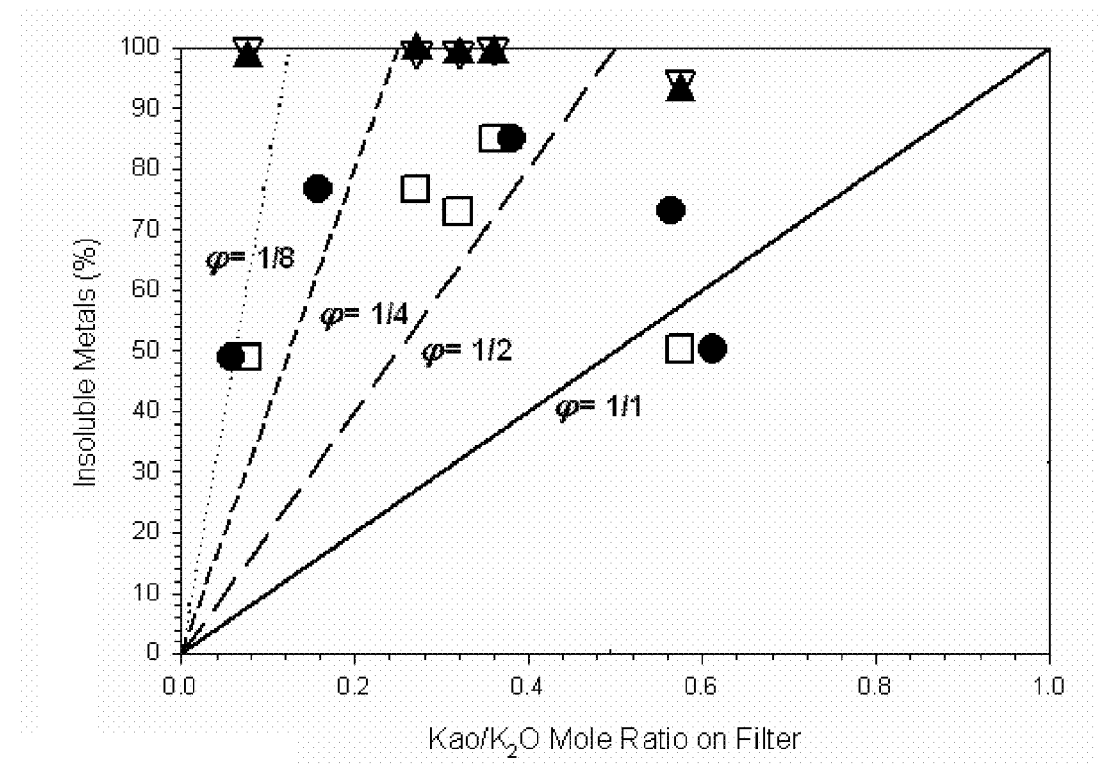
FIG. 2 depicts a plot of insoluble metals found in the filter cake following drop tube tests in a reducing environment, plotted as a function of the sorbent/metal equivalence ratio measured in respective filter cakes.

Before the disclosed process is described, it is to be understood that the aspects described herein are not limited to specific embodiments, apparatus, or configuration, and as such can, of course, vary. It is also to be understood that the terminology used herein is for the purpose of describing particular aspects only and, unless specifically defined herein, is not intended to be limiting.

All percentages, ratios and proportions herein are by weight, unless otherwise specified. All temperatures are in degrees Celsius (° C.) unless otherwise specified. All documents cited are in relevant part, incorporated herein by reference; the citation of any document is not to be construed as an admission that it is prior art with respect to the present invention.

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated component, feature, element, or step or group of components, features, elements or steps but not the exclusion of any other integer or step or group of integers or steps.

It must be noted that, as used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

A weight percent (wt. %) of a component, unless specifically stated to the contrary, is based on the total weight of the formulation or composition in which the component is included.

As used herein the term "contacting" includes the physical contact of at least one substance to another substance.

As used herein the term "sufficient amount" and "sufficient time" includes an amount and time needed to achieve the desired result or results, e.g., dissolve a portion of the polymer.

"Admixture" or "blend" as generally used herein means a physical combination of two or more different components.

In the case of sorbents, an admixture or blend of sorbents is a physical blend or combination of two or more different sorbents as opposed to a sorbent which is a single chemical species. For example, CaO is a single sorbent and not an admixture of calcium and oxygen.

As used herein the term "syngas" includes a mixture of carbon monoxide, carbon dioxide, hydrogen, and other gases that are produced when a carbon containing fuel reacts with steam and oxygen. Sources of carbon include coal, biomass, and municipal solid waste.

As used herein "raw syngas" includes syngas that has not undergone a purification step or procedure, for example, passed through a final filtration step, i.e., candle filter containing a cracking catalyst. Raw syngas can be formed within the disclosed apparatus, for example, by gasification of coal or biomass in the mixed fluid bed of the described apparatus. For example, the term "raw syngas" can mean the gas exiting the gasification zone into the freeboard, wherein the syngas has been treated in the gasification zone for removal of metals and sulfur compounds. In addition, the raw syngas can be prepared in a separate step and transferred to a second apparatus fitted with the decontamination elements disclosed herein. Raw syngas is also formed in gasifiers wherein at various stages prior to entering the filtration zone, the raw syngas can comprise particulate solids, tars, and metal contaminants.

As used herein "decontaminated syngas" means syngas that has contacted at least one sorbent. The sorbent can be one useful for removing metals, sulfur, or other contaminants. Decontaminated syngas comprises tars and other hydrocarbon resins and, as such, is passed over a cracking catalyst or other means for removing tars and/or other resins.

As used herein "a source of biomass" means any carbon-containing material that can be gasified. Coal, although not a form of biomass, is included as a potential fuel source for the gasification systems discussed herein. Non-limiting examples of other biomass sources includes municipal waste solids or sludges, switch grass, forest litter, wood chips, algae, corn stover, and rice straw.

As used herein the term "gasification zone" in some embodiments can be used interchangeably with the term "fluidized bed" or "bubbling bed."

As used herein the term "freeboard" includes the space above a relatively dense bubbling fluidized bed of solids in which smaller particles disengage from the bubbling bed and are carried out of the vessel with the gas flow.

As use herein the term "decontaminated syngas" means the gas exiting the gasification unit or the gas collected in the collection plenum that has been treated for removal of metals and sulfur compounds and for the removal of tars and ammonia impurities.

As used herein the term "cracking," "cracked" or variations thereof mean that hydrocarbons comprising greater than one carbon atom are reacted with a suitable catalyst to provide chemical species comprising one carbon atom. For example, raw syngas comprising ethane is cracked to any mono-carbon compound desired by the formulator, for example, carbon monoxide, carbon dioxide, methane, and the like.

As used herein the term "tar" refers to carbon containing material that include aromatic compounds such as benzene, naphthalene, and the like, polycyclic hydrocarbons, and hydrocarbons having one or more heteroatoms, i.e., nitrogen and sulfur.

As used herein the term "fuel ash" means the non-carbonaceous portion of a raw syngas source. For example, a source of coal comprising up to 10% of metals, sulfur compounds and the like has 10% by weight of fuel ash. The present process removes fuel ash from syngas that is generated from coal and biomass.

The disclosed process and apparatus can be configured by the formulator to meet the desired need. The disclosed process and apparatus provides several unmet advantages to the decontamination of syngas. The higher the purity of the syngas produced, the less negative effects are manifested in the use of the syngas. For example, syngas used for power production that comprises various impurities can harm burners by fouling due to metals and ash. It is also desirable that syngas used for conversion by Fischer-Tropsch processes is also free from unwanted impurities.

Disclosed is a syngas treatment system, comprising multiple syngas cleanup technologies combined in a compact system with additional technologies for syngas reforming, for treating syngas generated from a number of different gasification processes for the production of synthetic fuels from carbonaceous material, i.e., coal, coke, heavy oil, wood chips, municipal solid waste, agricultural wastes, algae, designated biomass crops. Heavy metals present in the raw syngas can foul downstream filters used for removing ash and other particulate solids. The metal sorbents can be added to the fluidized bed, above the fluidized bed or at any point prior to the raw syngas entering the filters. In addition, other undesirable materials present in the raw syngas will usually include phenols, aromatic hydrocarbons, ammonia, hydrogen cyanide, aliphatic hydrocarbons, and the like.

Process

The disclosed process can be adapted for use in any compatible vessel or in any equipment comprising the elements described herein above. For example, an existing coal or biomass gasification unit can be used or one or more units can be placed in parallel or series to effect the purification of a generated syngas, i.e., coal gasification or purification or re-purification of an existing source of raw syngas.

In one aspect the disclosed process comprises:
a) contacting syngas with one or more sorbents to capture metals, sulfur, and halides wherein the contacting is upstream of a catalytic candle filter to form decontaminated syngas; and
b) passing the decontaminated syngas through a candle filter containing a mixed cracking catalyst wherein ammonia and tars are removed thereby producing a purified syngas.

In another aspect the disclosed process comprises
a) contacting syngas with one or more sorbents to capture metals, sulfur, and halides upstream of a catalytic candle filter; and
b) passing the syngas through a catalytic candle filter containing a mixed catalyst that cracks tars to form purified syngas;
wherein the catalyst in step (b) promotes the water-gas shift reaction thereby adjusting the ratio of hydrogen gas to carbon monoxide gas present in the purified syngas.

One iteration of this aspect of the disclosed process comprises:
a) contacting a source of raw syngas with one or more sorbents chosen from:
  i) kaolin clays or kaolin-containing materials;
  ii) calcium-based sorbents;
  thereby removing metal and sulfur contaminants to form a decontaminated syngas; and
b) passing the decontaminated syngas formed in step (a) through a catalytic filter element to thereby removing solid particles and ash and wherein further tars are cracked, the catalytic filter element comprising a rare earth metal oxide or salt, a transition metal oxide or salt, or a combination thereof, thereby forming purified syngas.

Another iteration of this aspect of the disclosed process comprises:
a) contacting a source of raw syngas generated in a fluidized-bed coal or biomass gasification unit with a sorbent admixture comprising:
  i) kaolin clays or kaolinite-containing materials;
  ii) calcium-based sorbents;
  thereby removing metal and sulfur contaminants to form a decontaminated syngas; and
b) passing the syngas formed in step (a) through a catalytic cracking filter element thereby removing solid particles and ash and cracking tars and other hydrocarbon components, wherein the cracking filter comprises a rare earth metal oxide or salt, a transition metal oxide or salt, or a combination thereof thereby forming purified syngas.

In one iteration, the kaolin clay and calcium-based sorbents are injected upstream of the candle filters.

The purified syngas can comprise from about 0.1 parts per billion (ppb) ($1.0 \times 10^{-7}$%) by weight to about 100 ppm (0.1%) by weight of any single impurity. In one embodiment the purified syngas comprises from about 100 ppb to about 1 ppm of any single impurity.

Sorbents for metals can be any material that can capture, react with, absorb or otherwise trap a metal that is present in the syngas raw material. For example, the metal sorbent can be a crystalline aluminosilicate clay. In one embodiment, the metal sorbent is kaolin clay. The metal contaminants in the syngas may include As, Be, Cd, Co, Cr, Fe, K, Na, Ni, Mn, Pb, Sb, and Se. For the case of syngas derived from a biomass or lignite, the concentrations of K and Na will prevail over those of other possible metal contaminants. As such, in one embodiment, the sorbent is chosen such that removal of K and Na is obtained. By removal of a metal is meant the purified syngas comprises no more than 10,000 ppb (0.01%) by weight of any single metal contaminant. In another embodiment, metal contaminants are removed to a level of less than about 1,000 ppb, while in a further embodiment, the metal contaminants are removed to a level of less than about 100 ppb.

In one example, the kaolin clays or kaolinite-containing materials can capture trace metals such as lead, cadmium, sodium, and potassium and the calcium-based sorbents can capture sulfur-containing species such as $H_2S$, COS, and $CS_2$.

One useful source of metal sorbents includes certain paper mill byproducts that contain kaolin clay. Kaolin clay is used in the manufacture of paper products and can comprise as much as 60 wt % of certain de-carbonized forms of de-inking sludges. Sorbents produced from this material will have benefits associated with the calcium forms in the sorbent as well as the kaolin clay. The calcium sorbents will capture some of the metal types, and the calcium forms will also capture sulfur and halide compounds. The calcium may also help to crack some of the heavy tars. All of these mechanisms are temperature dependent.

In use, the amount of metal sorbent can comprise from about 0.01 wt. % to about 100 wt. % of the fuel ash content. In one embodiment, the metal sorbent comprises from about 1 wt. % to about 10 wt. % of the fuel ash content. In another embodiment, the metal sorbent comprises from about 0.1 wt. % to about 5 wt. % of the fuel ash content. In a further embodiment, the metal sorbent comprises from about 1 wt. % to about 2 wt. % of the fuel ash content. In a yet further embodiment, the metal sorbent comprises from about 0.01 wt. % to about 2 wt. % of the fuel ash content. In a still further embodiment, the metal sorbent comprises from about 0.1 wt. % to about 2 wt. % of the fuel ash content. In use, however, the amount of metal sorbent can comprise any amount from about 0.01 wt. % to about 100 wt. % of the fuel ash content, for example, 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 2 wt. %, 3 wt. %, 4 wt. %, 5 wt. %, 6 wt. %, 7 wt. %, 8 wt. %, 9 wt. %, and 10 wt. %. The amount of metal sorbent can be any fractional amount thereof, for example, 0.055 wt. %, 0.33 wt. % and 4.92 wt %. In addition, the amount of sorbent can vary during the process due variations in the content of the syngas raw material, for example, change in metal contaminant levels as different sources of syngas raw materials are used.

Sorbent for sulfur can be any material that can capture, react with, or absorb sulfur containing compounds that are present in the syngas raw material or are thus formed during the decontamination process. For example, the sulfur sorbent can be a calcium-based or calcium comprising material. In one embodiment, the sulfur sorbent is lime, crushed lime, limestone, crushed limestone, and the like. In another embodiment, the sorbent is calcium hydroxide ($Ca(OH)_2$), calcium carbonate ($CaCO_3$), calcium oxide (CaO), and the like, or mixtures thereof. The sulfur containing compounds that can be removed can be organic or inorganic sulfur compounds. Non-limiting examples include $H_2S$, COS, $CS_2$, and the like.

In use, the amount of sorbent for sulfur is adjusted depending upon the amount of sulfur present in the starting raw material, for example, in the coal, biomass, or waste material. As such, the calcium content of the sorbent (of all types injected) is adjusted such that the number of moles of calcium to the number of moles of sulfur is from about 0.5:1 to about 5:1. In one embodiment the number of moles of calcium to the number of moles of sulfur is from about 1:1 to about 5:1.

In a further embodiment, the number of moles of calcium to the number of moles of sulfur is from about 2:1 to about 5:1. In a still further embodiment, the number of moles of calcium to the number of moles of sulfur is from about 0.5:1 to about 2:1. In a yet further embodiment, the number of moles of calcium to the number of moles of sulfur is from about 1:1 to about 1.5:1. In a still yet further embodiment, the number of moles of calcium to the number of moles of sulfur is about 1:1.

In addition, the amount of sorbent can vary during the process due to uptake of the absorbent, or the amount of sorbent can be adjusted to compensate for any variations in the content of the syngas raw material, for example, change in sulfur contaminant levels as different sources of syngas raw materials are used.

The amount of sulfur sorbent used can also be determined by adjusting the amount of sorbent to the amount of sulfur contaminants present based upon the ratio of calcium atoms that are present in the sorbent in relation to the amount of sulfur atoms present in the syngas In one embodiment, the molar ratio of the sulfur sorbent calcium to the syngas sulfur is from about 5:1 to about 1:1. In another embodiment, the molar ratio of the sulfur sorbent calcium to the syngas sulfur is from about 2:1 to about 1:1. In a further embodiment, the molar ratio of the sulfur sorbent calcium to the syngas sulfur is from about 1.5:1 to about 1:1. In a still further embodiment, the molar ratio of the sulfur sorbent calcium to the syngas sulfur is from about 1:1 to about 1:2.

The amount of sorbents, however, can be adjusted by the formulator such that the decontaminated syngas can have more or less of contaminants. For example, some syngas necessarily is freer of metal contaminants than other syngas depending upon the use. Syngas used for bulk heating can require less purity, i.e., higher levels of contaminants, while syngas used in an apparatus can require higher purity. As such, the raw syngas entering the candle filter can comprise less than about 1 parts per million (ppm) of one or more metals. In another embodiment, the raw syngas entering the candle filter can comprise less than about 100 parts per billion (ppb) of one or more metals. In a further embodiment, the raw syngas entering the candle filter can comprise less than about 10 ppb of one or more metals. In a yet further embodiment, the raw syngas entering the candle filter can comprise less than about 1 ppb of one or more metals.

In use, when the source of raw syngas is contacted with the sorbents the contacting can take place at a temperature of at least about 700° C. In one embodiment, the contact temperature is from about 700° C. to about 1300° C. In another embodiment, the contact temperature is from about 815° C. to about 875° C. The temperature can, however, have any temperature above 700° C., for example, 815° C., 816° C., 817° C., 818° C., 819° C., 820° C., 821° C., 822° C., 823° C., 824° C., 825° C., 826° C., 827° C., 828° C., 829° C., 830° C., 831° C., 832° C., 833° C., 834° C., 835° C., 836° C., 837° C., 838° C., 839° C., 840° C., 841° C., 842° C., 843° C., 844° C., 845° C., 846° C., 847° C., 848° C., 849° C., 850° C., 851° C., 852° C., 853° C., 854° C., 855° C., 856° C., 857° C., 858° C., 859° C., 860° C., 861° C., 862° C., 863° C., 864° C., 865° C., 866° C., 867° C., 868° C., 869° C., 870° C., 871° C., 872° C., 873° C., 874° C., and 875° C. However, the contact temperature can have any fractional temperature from about 750° C. to about 1200° C., for example 830.5° C., 843.7° C., and 851.88° C.

The disclosed process can be adapted to remove ammonia gas contaminants prior to entry of the treated syngas into final filtration zone. The reverse selective catalytic reduction (reverse SCR) reaction involves the same reaction that is used to remove nitric oxide (NO) from the flue gas streams of conventional coal-fired power plants. This reaction is outlined in Equation 1 below:

$$6NO + 4NH_3 \rightarrow 5N_2 + 6 H_2O \quad \text{Equation 1}$$

In the present process, instead of injecting ammonia gas into the stream to remove nitrogen oxides, i.e., $NO_x$ species present as contaminants, nitric oxide is injected into the raw gas stream to remove contaminating ammonia. If this reaction is used, the treated syngas leaving a fluidized-bed gasifier must be cooled before it enters an adjacent vessel where the catalytic reaction between the NO and $NH_3$ takes place. The required temperature range for this reaction is in the range of 300 to 450° C. One drawback of nitric oxide addition is the fact that nitric oxide can react with the carbon monoxide present in syngas that is generated in a gasifier unit, for example, a coal or biomass gasification unit. This undesired reaction is outlined in Equation 2 below:

$$2NO + 2CO \rightarrow N_2 + 2CO_2 \quad \text{Equation 2}$$

As such, a further aspect the present disclosure relates to a process for decontaminating syngas comprising:
a) contacting raw syngas with an admixture of sorbents chosen from:
  i) kaolin clays or kaolin-containing materials, amorphous aluminosilicates, aluminates, and silicates, and calcium-based sorbents that capture of trace metals such as lead, cadmium, arsenic and selenium, sodium, and potassium;

ii) calcium-based sorbents that capture of sulfur-containing species such as $H_2S$, COS, and $CS_2$; and
iii) calcium-based or magnesium-based sorbents that capture halides-containing contaminants chosen from chlorine, bromine, fluorine, iodine, hydrogen chloride, hydrogen bromide, hydrogen fluoride, and hydrogen iodide, and
iv) sorbents that can remove more than one of the contaminants listed in (i) to (iii);
at high temperatures equal to or greater than about 700° C. thereby capturing onto sorbent particles one or more contaminates chosen from metals, sulfur species, and halides wherein the sorbent particles are captured in a downstream filter to form a decontaminated syngas;
b) passing the decontaminated syngas formed in step (a) through a catalytic cracking filter element thereby removing the sorbent particles and ash and cracking tars and other hydrocarbon components, wherein the cracking filter comprises a rare earth metal oxide or salt, a transition metal oxide or salt, or a combination thereof thereby forming a sulfur-free, metal free, cracked syngas;
c) passing the sulfur-free, metal free, cracked syngas into a cooling zone for wherein the syngas is cooled to a temperature of at least 370° C. to form a cooled sulfur-free, metal free, cracked syngas; and
d) passing the cooled, sulfur-free, metal free, cracked syngas into a vessel comprising a source of nitric oxide, wherein the nitric oxide reacts with ammonia contaminants present in the sulfur-free, metal free, cracked syngas to produce a purified syngas.

FIG. 1 depicts a generic, modified coal or biomass gasification unit 100 wherein nitric oxide can be injected at a point after the treated syngas exits the gasification unit and is cooled subsequent to the injection of nitric oxide (NO) into the treated syngas to remove ammonia gas contamination according to Equation 1. The following are notable components of the modified gasification unit 110: gasification zone A', freeboard B, collection zone C, filtration zone D, collection plenum E, cooling zone F, nitric oxide reaction zone G, fuel inlet 120, oxygen/steam inlet 130, slag outlet and/or recycle outlet 140, filters 150, blow back gas inlet 160, treated syngas outlet 170, treated gas inlet 175, cooled treated gas outlet 180, cooled treated gas inlet 185, nitric oxide inlet 190, and purified syngas outlet 195. In addition to treatment of the syngas with nitric oxide in zone G, metal and sulfur sorbents can be added at any point in a process adapted to the apparatus to remove contaminants, i.e., metals, sulfur-containing compounds, and the like, and to crack tars that are present.

Figure 3:
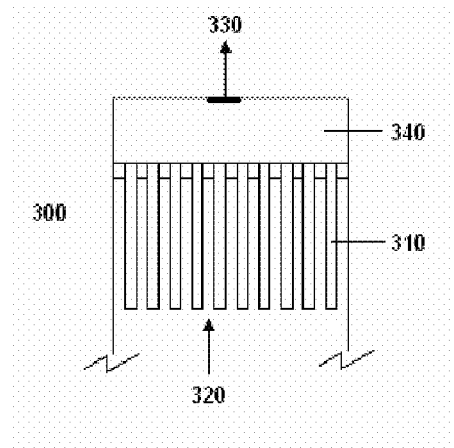
FIG. 3 depicts a filtration zone having a plurality of elongate porous ceramic candle filters useful for decontaminating syngas.

Also disclosed is a process for protecting a filter from damage due to metal contaminants comprising, injecting a metal sorbent upstream of the filtration zone. FIG. 3 depicts an exemplary filtration zone 300 that can be used as part of the syngas decontamination process. Filtration zone 300 comprises a plurality of candle filters 310 for treating a syngas stream 320 that has been typically contacted with one or more metal or sulfur sorbents. After passing through the filters, the decontaminated syngas is collected in plenum 340 and exits via stream 330. The decontaminated syngas can be optionally further treated down stream, i.e., contacted with nitric oxide to further remove any ammonia present.

Figure 4:
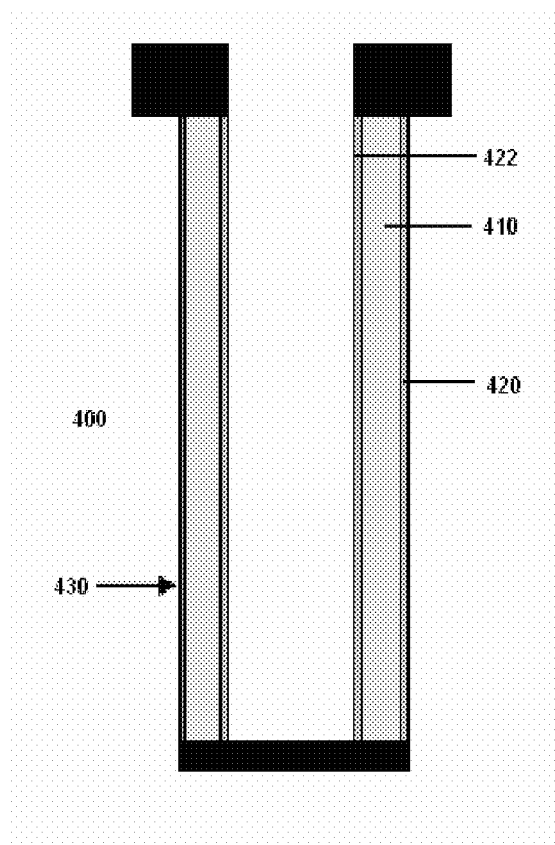
FIG. 4 depicts an elongate porous ceramic candle filter having a porous ceramic inner and outer surface and mixed catalyst bed for cracking tar and ammonia.

FIG. 4 depicts a cut away view of an exemplary candle filter 400 having a packed bed of catalyst material 410 capable of thermally cracking tar and ammonia contaminates present within the syngas. Catalyst bed material 410 is housed between two opposed porous ceramic walls 420 and 422 such that a stream of syngas 430 can flow through the outer ceramic wall 420 thereby contacting catalyst material 410 wherein ammonia can be removed and/or tars are thermally cracked. The purified syngas then passes through the inner ceramic wall 422 and exits the candle filter as purified syngas.

An exemplary commercially available candle filter, such as depicted in FIG. 4, includes those filters developed by PALL™ as described by Nacken et al. in "Development of a tar reforming catalyst for integration in a ceramic filter element and use in hot gas cleaning," *Ind. Eng. Chem. Res.* 46, pp. 1945-1951 (2007) included herein by reference in its entirety. The elongate porous ceramic candle filter can comprise any mixed catalyst that can crack both any tars and ammonia contaminants that the raw syngas can comprises.

The candle filters can contain cracking catalysts for removal of heavy tars, as well as lower molecular weight tars, for example naphthalene and phenols. Non-limiting examples of theses catalyst include nickel or other transition metals that are doped onto olivine [$(Mg,Ni)_2SiO_4$] and other minerals such as a strong alumina lattice or glass-ceramics, i.e., those disclosed be Felix L. "Thermally Impregnated Ni-Olivine Catalysts for Decomposing TAR in Biomass Gasification", Paper) B5.3, 16$^{th}$ European Biomass Conference and Exhibition, Valencia, Spain, Jun. 2-6, (2008) included herein by reference in its entirety.

In addition, dolomite ($CaMg(CO_3)_2$) can be used as a catalyst and/or sorbent for cracking tars either before the filtration system or as part of the catalyst bed located within the candle filters. Once activated, for example, calcined at about 800° C., metals, inter alia, iron and nickel can be added to enhance the catalytic tar cracking capacity of the filter.

In one embodiment, dolomite and calcium oxide can be injected into the syngas upstream of the candle filters in order to remove sulfur, acids, trace metals and other contaminants not captured by other sorbents that can be optionally present. In addition, prevention of Ni poisoning can be prevented by using an alumina substrate to mount Ni along with promoters such as Li, K, Ca, and Mg. By changing the electrical state and geometry of the catalyst surface layer, the promoters change the surface free energy of the crystal planes thereby releasing electrons to the Ni crystallite which weakens the formation of deactivated Ni in the form of NiS.

A further nickel compounds that can be used as tar cracking catalysts is NiMo. Other non-limiting examples of tar cracking catalysts include $Al_2O_3$, CaO, $SiO_2$, and CuMn.

Figure 5:
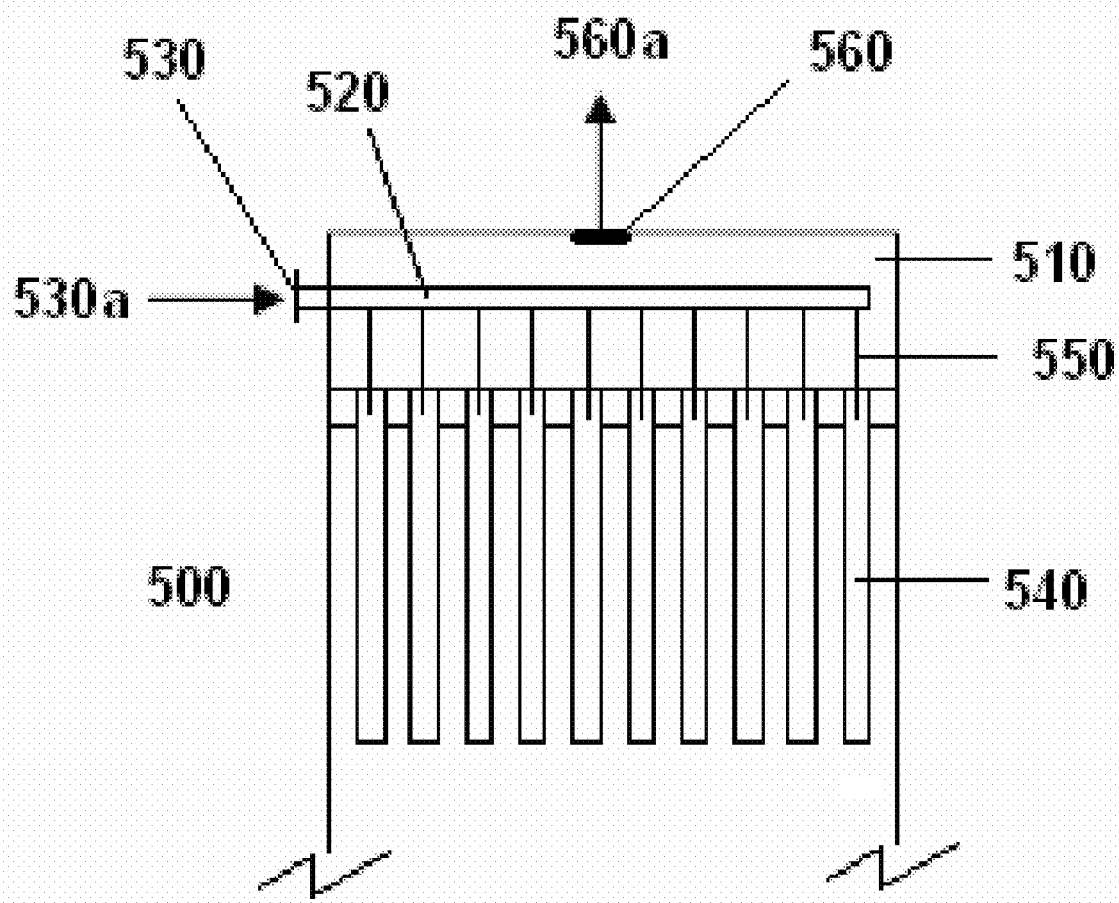
FIG. 5 depicts a generalized filtration zone having a plurality of elongate porous ceramic candle filters equipped with an inert gas manifold for back blowing particulate matter off of the filter surface.

FIG. 5 represents an alternate configuration of a purifications zone wherein the candle filter further comprises a dust cover to collect ash, soot and other material that cannot pass through the pores of the outside wall of the candle filter. FIG. 5 depicts filtration zone 500 having a collection plenum 510 modified to include an inert gas back blow manifold 520 as shown. In this example, inert gas stream 530*a* enters manifold 520 through inlet 530 and is directed downward through hollow tubes 550 into one or more candle filters 540 wherein particulate material collected on the dust cover is blown off. When in the back blow manifold is in use, decontaminated syngas can optionally continue to exit outlet 560 via stream 560*a*.

Removal of Ammonia from Syngas

EXAMPLE 1

To a reactor tube having an inside diameter of 3.5 cm, a heated zone length of 114 cm, and a catalyst bed depth of 60 cm, is treated with a simulated syngas. The simulated syngas comprised nitrogen gas containing 40,000 ppm (4% by weight) of ammonia. The simulated gas was fed into the reactor tube at a flow rate of 10 L/min resulting in a gas residence time in the catalyst bed of approximately 3.5 seconds. Nitric oxide was fed into the simulated syngas stream just ahead of the catalyst bed. The temperature of the heated zone was varied from about 260° C. to about 450° C. The tests were conducted at atmospheric pressure. This system simulated the generation of about 3,000 ppm of $NH_3$ at a gasifier pressure of about 16 bar. The results of these experiments are shown in Table I.

TABLE I

| Run No. | Ratio of NO:$NH_3$ | Temperature | % $NH_3$ removed |
|---|---|---|---|
| 1 | 1.3:1 | 370° C. | 95 |
| 2 | 1.5:1 | 370° C. | 100 |

EXAMPLE 2

As described herein, nitric oxide can react in an undesirable side reaction with the carbon monoxide of syngas to form nitrogen gas and carbon dioxide. The present process is conducted under conditions wherein this side reaction is either eliminated or is significantly reduced. Carbon monoxide and hydrogen gas were added to the simulated syngas stream from Example 1. At temperatures below 370° C., the consumption of carbon monoxide by nitric oxide became less pronounced. At 260° C. the amount of ammonia reduced in the simulated syngas stream went from about 40,000 ppm to about 560 ppm, a 98.6% reduction using a NO:$NH_3$ molar ratio of about 2.5:1. At a ratio of NO:$NH_3$ of about 2:1, an 84% reduction of ammonia was achieved.

The above results, when applied to the syngas conditions having an ammonia concentration of 3000 ppm, the carbon monoxide concentration is only reduced from 15% of the syngas stream to 14.7% of the syngas stream at a NO:$NH_3$ molar ratio of about 2.5:1. At the NO:$NH_3$ molar ratio of about 2:1, the carbon dioxide level is only reduced to 14.85% of the syngas stream. As such, the present process can remove the contaminating ammonia that is present in syngas while only slightly affecting the level of carbon monoxide or not affecting the level of carbon monoxide at all.

Removal of Metal Contaminants from Syngas

EXAMPLE 3

Tests were conducted in a fixed-bed reactor, simulating a catalytic filter element, so as to more easily add contaminating metals. The reactor contained a modified fluidized-bed catalytic cracking catalyst. In this example, a modified ruthenium oxide-based material was tested. The catalyst had a mean particle size of 70 μm. The temperature was maintained at about 425° C. Syngas from an entrained-flow coal gasifier at a pressure of 220 psig was passed through the reactor, and the cracking of various organics was evaluated by Fourier-Transform Infrared (FTIR) analysis of the gas entering and leaving the reactor. In 60 hours of continuous syngas treatment, the results in Table 2 were obtained.

| Component | Percent removed |
|---|---|
| Ethylene | 100 |
| Acenaphthene | 87 |

-continued

| Component | Percent removed |
|---|---|
| Phenantrene | 75 |
| Naphthalene | 62 |

EXAMPLE 4

The following tests were conducted to assess the effectiveness of high-temperature sorbents at capturing metals from syngas, protecting the disclosed filters from damage, i.e., protection of the catalysts. To simulate the injection of metal sorbents upstream of the filtration zone of a transport gasifier, the tests were conducted in a tube furnace maintained at a temperature of about 815° C. Syngas from an entrained-flow coal gasifier at a pressure of about 220psig was passed through a tube in the tube furnace where it passed through a sintered metal filter at the exit of the tube furnace. At the reactor inlet, a chamber was installed to vaporize a known amount of a metal into the syngas. In order to inject the sorbent used for the trace metal capture, a tube was installed along the reactor centerline. The end of this tube could be inserted at various positions in the reactor to vary the resonance time of the sorbent in the syngas prior to exposure to the filter in order to measure to effectiveness of resonance time and sorbent to added metal capture efficiency.

FIG. 10 is a graph of the metals found in the filter cake following the slipstream tests plotted as a function of the sorbent/metal ratios. The various data points in FIG. 10 indicate the amount of insoluble potassium/kaolinite based upon the amount of silicon present on the filter (●), the amount of insoluble potassium/kaolinite based upon the amount of aluminum present on the filter (□), the amount of insoluble silicon/kaolinite based upon the amount of aluminum present on the filter (▲), and the amount of insoluble aluminum/kaolinite based upon the amount of aluminum present on the filter (▽). Metal capture was tested at four different equivalence ratios of kaolinite sorbent to metal (potassium from $K_2O$) at ratios of 1:1, 1:2, 1:4 and 1:8. As indicated in FIG. 10, very little soluble silicon or aluminum was found in the filter cake for any of the ratios tested, suggesting that few if any soluble metal/sorbent eutectic products were formed. In addition, these results provide evidence that the meta-kaolinite crystal structure remained intact and that very little melting of particles occurred. As indicated, as little as 50%, and as much as 85% of the potassium formed in the particles was insoluble, thereby suggesting that significant reactive capture of potassium occurred and that the potassium/sorbent products formed are stable.

Scanning Electron Microscopy (SEM) and Energy Dispersive Spectroscopy (EDS) analysis showed that when the potassium in the syngas was allowed to contact the iron-aluminide candle filters without sorbent injection, then the potassium reacted with and began destroying the candle filter elements, even displacing and pulling out the aluminum from the filter material.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A process for decontaminating syngas, comprising:
   a) contacting syngas with one or more sorbents wherein the contacting is upstream of a catalytic candle filter, to form decontaminated syngas; and
   b) passing the decontaminated syngas through a candle filter containing a mixed cracking catalyst wherein ammonia and tars are removed thereby producing a purified syngas.

2. The process according to claim 1, wherein the syngas is produced by gasification of coal.

3. The process according to claim 1, wherein the syngas is produced from gasification of biomass chosen from municipal waste solids or sludges, switch grass, forest litter, wood chips, algae, corn stover, and rice straw.

4. The process according to claim 1, wherein the one or more sorbents comprises a metal sorbent chosen from kaolin clays, kaolin-containing materials, calcium-based sorbents, or a mixture thereof.

5. The process according to claim 1, wherein the one or more sorbents comprises a sulfur sorbent chosen from calcium-based or calcium comprising material, a magnesium-based sorbent, or an alkaline-based sorbent, or mixtures thereof.

6. The process according to claim 1, wherein the one or more sorbents comprises a halide sorbent chosen from calcium-based or calcium comprising material, a magnesium-based sorbent, or an alkaline-based sorbent, or mixtures thereof.

7. The process according to claim 1, wherein the one or more sorbents comprises a sulfur sorbent chosen from lime, crushed lime, limestone, or crushed limestone.

8. The process according to claim 1, wherein the one or more sorbents comprises a sulfur sorbent chosen from calcium hydroxide, calcium carbonate, calcium oxide, dolomite, magnesium oxide, recycled pulp or paper waste material.

9. The process according to claim 1, wherein the sorbent for each contaminant is the same sorbent or a combinations of sorbents that can absorb more than one contaminant.

10. The process according to claim 1, wherein the one or more sorbents comprises a sulfur sorbent comprising calcium and the amount of sulfur sorbent added is such that the number of moles of calcium to the number of moles of sulfur is from about 0.5:1 to about 5:1.

11. The process according to claim 1, wherein a tar cracking catalyst is added to the syngas stream prior to entry of the syngas into the catalytic filter.

12. The process according to claim 1, wherein a tar cracking catalyst comprising dolomite, $Al_2O_3$, CaO, $SiO_2$, CuMn, NiMo, or a combination thereof is injected into the syngas prior to entry of the syngas into the catalytic filter.

13. The process according to claim 1, wherein the catalytic filter comprises nickel, nickel oxide, or a nickel-comprising compound.

14. The process according to claim 1, wherein the catalytic filter comprises a nickel catalyst deposited upon a substrate and further comprising one or more promoters chosen from Li, K, Ca, and Mg.

15. The process according to claim 1, wherein the process is conducted in a coal gasification unit.

16. The process according to claim 1, wherein further a source of nitric oxide is added.

17. The process according to claim 1, wherein the metal sorbent is added to the syngas prior to passing the syngas through a cracking catalyst.

18. The process according to claim 1, wherein the cracking catalyst is a rare earth metal or transition metal oxide or salt.

19. The process according to claim 1, wherein the cracking catalyst is an oxide or salt of platinum, palladium, iridium, osmium, rhodium, ruthenium, rhenium, lanthanum, vanadium, or nickel, or a mixture thereof.

20. A process for decontaminating syngas, comprising:
   a) contacting syngas with one or more sorbents upstream of one or more catalytic candle filters; and
   b) passing the syngas through the catalytic candle filters, the filters containing a mixed catalyst thereby cracking tars to form purified syngas;
   wherein the catalyst in step (b) further promotes a water-gas shift reaction thereby adjusting the ratio of hydrogen gas to carbon monoxide gas present in the purified syngas.

21. The process according to claim 16, wherein the cracking catalyst is a rare earth metal or transition metal oxide or salt.

22. The process according to claim 16, wherein the cracking catalyst is an oxide or salt of platinum, palladium, iridium, osmium, rhodium, ruthenium, rhenium, lanthanum, vanadium, or nickel, or a mixture thereof.

23. The process according to claim 16, wherein further a source of nitric oxide is added.

24. A process for decontaminating syngas, comprising:
   a) contacting raw syngas with an admixture of sorbents chosen from:
      i) kaolin clays or kaolin-containing materials, amorphous aluminosilicates, aluminates, and silicates, and calcium-based sorbents that capture trace metals;
      ii) calcium-based sorbents that capture sulfur-containing species; and
      iii) calcium-based or magnesium-based sorbents that capture halides-containing contaminants chosen from chlorine, bromine, fluorine, iodine, hydrogen chloride, hydrogen bromide, hydrogen fluoride, and hydrogen iodide, and
      iv) sorbents that can remove more than one of the contaminants listed in (i) to (iii);
      at high temperatures equal to or greater than about 700° C. thereby capturing onto sorbent particles one or more contaminates chosen from metals, sulfur species, and halides wherein the sorbent particles are captured in a downstream filter to form a decontaminated syngas;
   b) passing the decontaminated syngas formed in step (a) through a catalytic cracking filter element thereby removing the sorbent particles and ash and cracking tars and other hydrocarbon components, wherein the cracking filter comprises a rare earth metal oxide or salt, a transition metal oxide or salt, or a combination thereof thereby forming a sulfur-free, metal free, cracked syngas;
   c) passing the sulfur-free, metal free, cracked syngas into a cooling zone wherein the syngas is cooled to a temperature of at least 370° C. to form a cooled sulfur-free, metal free, cracked syngas; and
   d) passing the cooled, sulfur-free, metal free, cracked syngas into a vessel comprising a source of nitric oxide, wherein the nitric oxide reacts with ammonia contaminants present in the sulfur-free, metal free, cracked syngas to produce a purified syngas.

25. A method for purifying syngas, comprising:
a) contacting a source of raw syngas with one or more sorbents chosen from:
   i) kaolin clays or kaolin-containing materials;
   ii) calcium-based sorbents;
   thereby removing metal and sulfur contaminants to form a decontaminated syngas; and
b) passing the decontaminated syngas formed in step (a) through a catalytic filter element to thereby remove solid particles and ash and wherein further tars are cracked, the catalytic filter element comprising a rare earth metal oxide or salt, a transition metal oxide or salt, or a combination thereof, thereby forming purified syngas.

26. The method of claim 24, wherein the calcium-based sorbent that captures trace metals comprises lead, cadmium, arsenic, selenium, sodium, potassium or a combination thereof.

27. The method of claim 24, wherein the calcium-based sorbent that captures sulfur-containing species comprises $H_2S$, COS, $CS_2$, or a combination thereof.

* * * * *